United States Patent [19]

Bertone

[11] 4,241,299
[45] Dec. 23, 1980

[54] CONTROL SYSTEM FOR BATTERY-OPERATED PUMP

[75] Inventor: Gregory A. Bertone, Monroeville, Pa.
[73] Assignee: Mine Safety Appliances Company, Pittsburgh, Pa.
[21] Appl. No.: 27,569
[22] Filed: Apr. 6, 1979
[51] Int. Cl.³ .............................................. H02P 3/08
[52] U.S. Cl. .................................... 318/474; 318/331; 318/341
[58] Field of Search ............... 318/331, 341, 452, 453, 318/455, 474; 361/30, 31

[56] References Cited

U.S. PATENT DOCUMENTS

| 3,569,807 | 3/1971 | Ulrich | 318/341 |
| 3,569,810 | 3/1971 | Thiele | 318/341 |
| 3,588,654 | 6/1971 | Balazs | 318/341 |
| 3,683,253 | 8/1972 | Rummel et al. | 318/341 |
| 3,803,470 | 4/1974 | Vosteen | 318/341 |

*Primary Examiner*—David Smith, Jr.
*Attorney, Agent, or Firm*—Thomas H. Murray

[57] ABSTRACT

A motor control system, particularly adapted for use with a battery-operated atmospheric hazard sampling pump, which can vary motor speed over a range of 50:1 with the use of a voltage controlled pulse width modulator. The system includes a back EMF circuit which develops a voltage, proportional to motor speed, which is compared with a speed reference signal to develop an error signal for the pulse width modulator. Automatic shutdown of the motor occurs for controlled periods when a blocked pump condition occurs and motor current rises above a predetermined limit.

5 Claims, 4 Drawing Figures

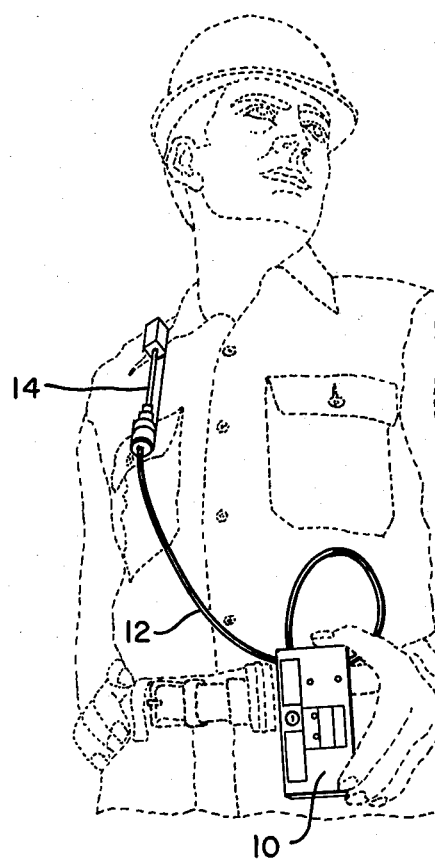
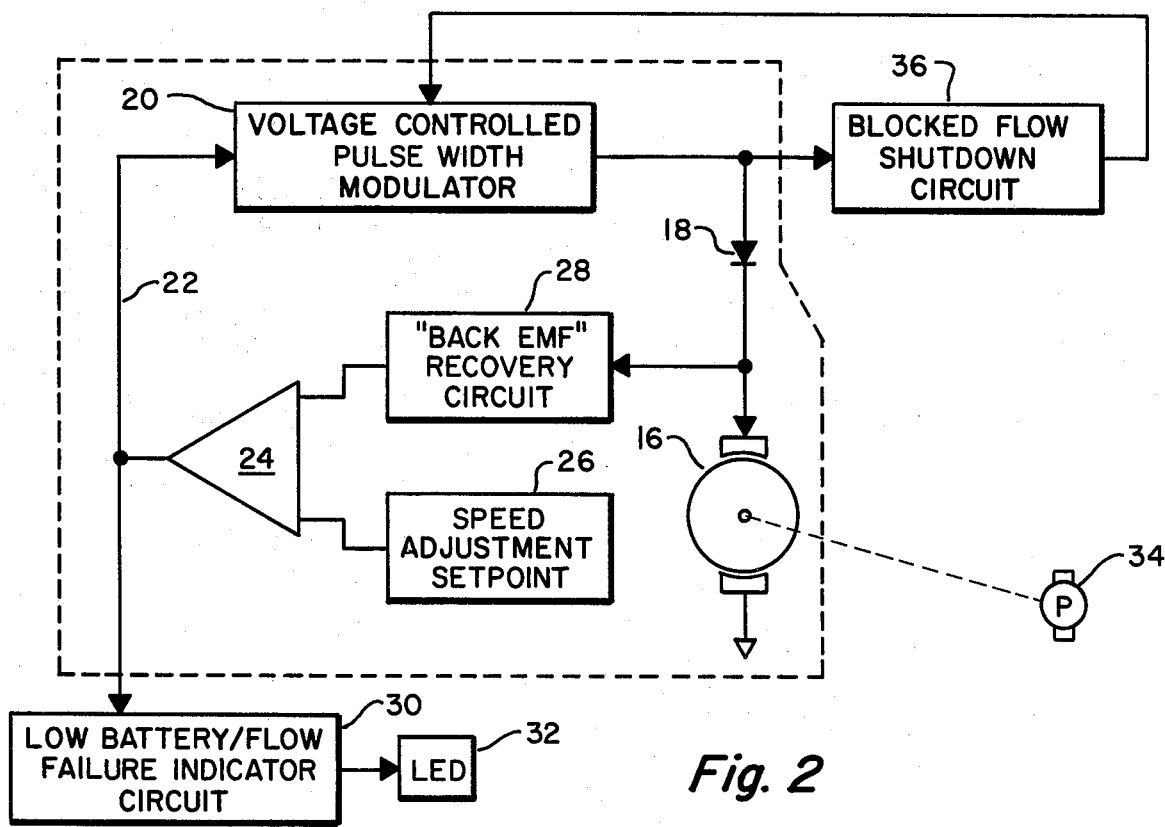
Fig. 1
Fig. 2

CONTROL SYSTEM FOR BATTERY-OPERATED PUMP

BACKGROUND OF THE INVENTION

While not limited thereto, the present invention is particularly adapted for use with an atmospheric hazard sampling pump used to detect concentrations of harmful dust or gas in coal mines and other locations where the atmosphere may contain harmful constituents. A pump of this type must provide the necessary airflow for identifying atmospheric hazards with colorimetric or charcoal detector tubes. At the same time, it must be small enough and light enough to fit into a shirt pocket or clip onto the belt of a mine employee. The drive motor for the pump must be battery-powered and should incorporate a speed control system for minimizing speed fluctuations due to varying pneumatic loads and/or changing battery voltage.

SUMMARY OF THE INVENTION

In accordance with the present invention, the motor for an atmospheric hazard sampling pump is preferably of the ironless rotor DC type having a very low inductance. Pulse width modulating means are provided for supplying a pulsed voltage to the motor, the width of the pulses from the output of the modulating means being controlled by an error signal derived by a comparison of a voltage proportional to motor speed with a reference speed signal. Whenever the motor is overloaded and motor current increases above a preset threshold, a latching circuit is set which removes the drive from the motor. A timing circuit applies a reset pulse to this latching circuit every 15 seconds until, when the overload condition is alleviated, the latching circuit is reset and the motor is permitted to run. Finally, the invention incorporates a special circuit which monitors the output of the error amplifier. When the voltage at this point exceeds a preset limit, a normally-energized light-emitting diode is extinguished, thereby signifying a blocked flow condition. Additionally, the diode will be extinguished in response to a low battery condition.

The above and other objects and features of the invention will become apparent from the following detailed description taken in connection with the accompanying drawings which form a part of this specification, and in which:

FIG. 1 is an illustration of an atmospheric sampling pump of the type with which the motor control system of the invention may be used;

FIG. 2 is a block diagram of the motor control system of the invention; and

Figure 3A:
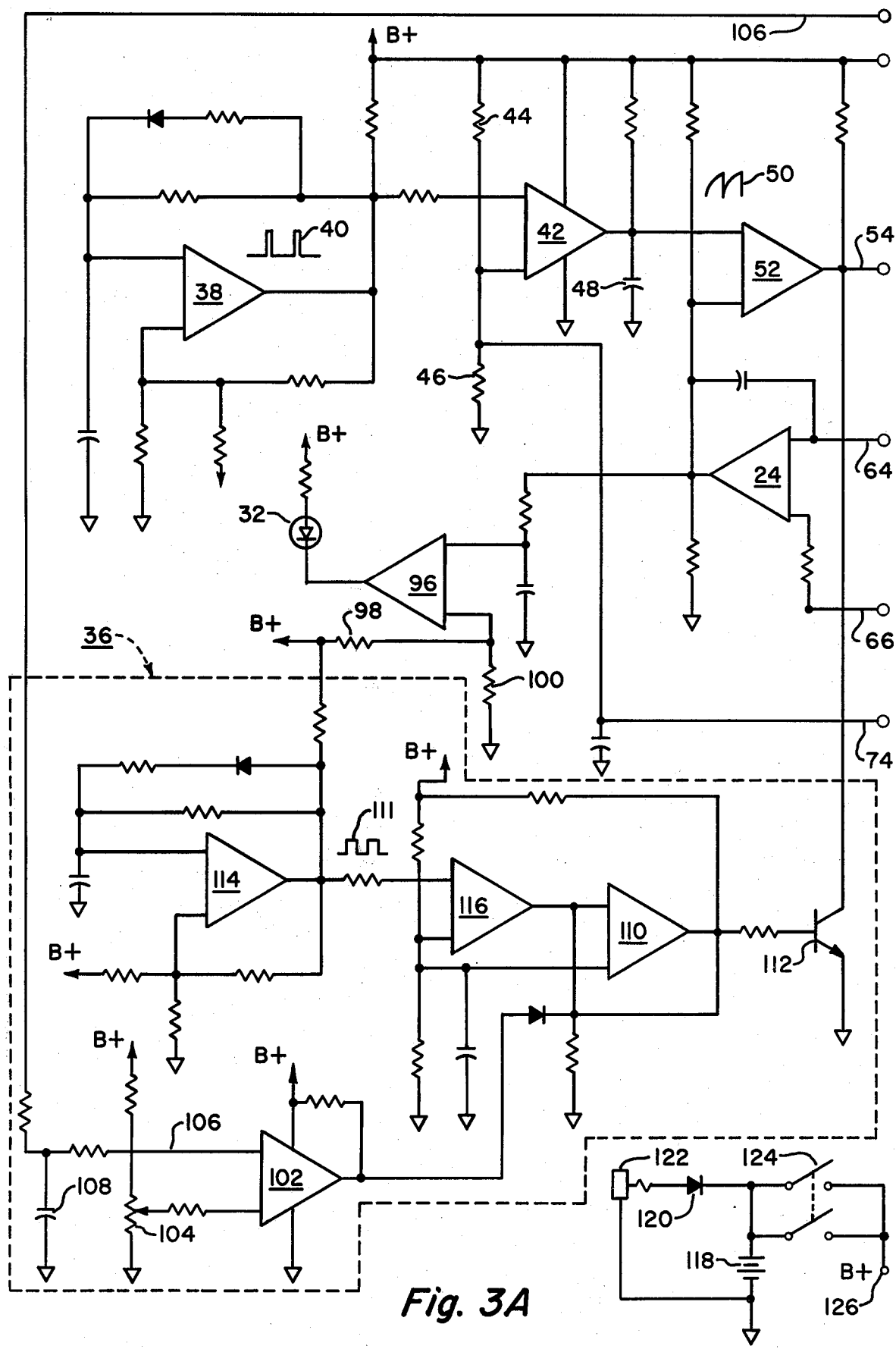
Figure 3B:
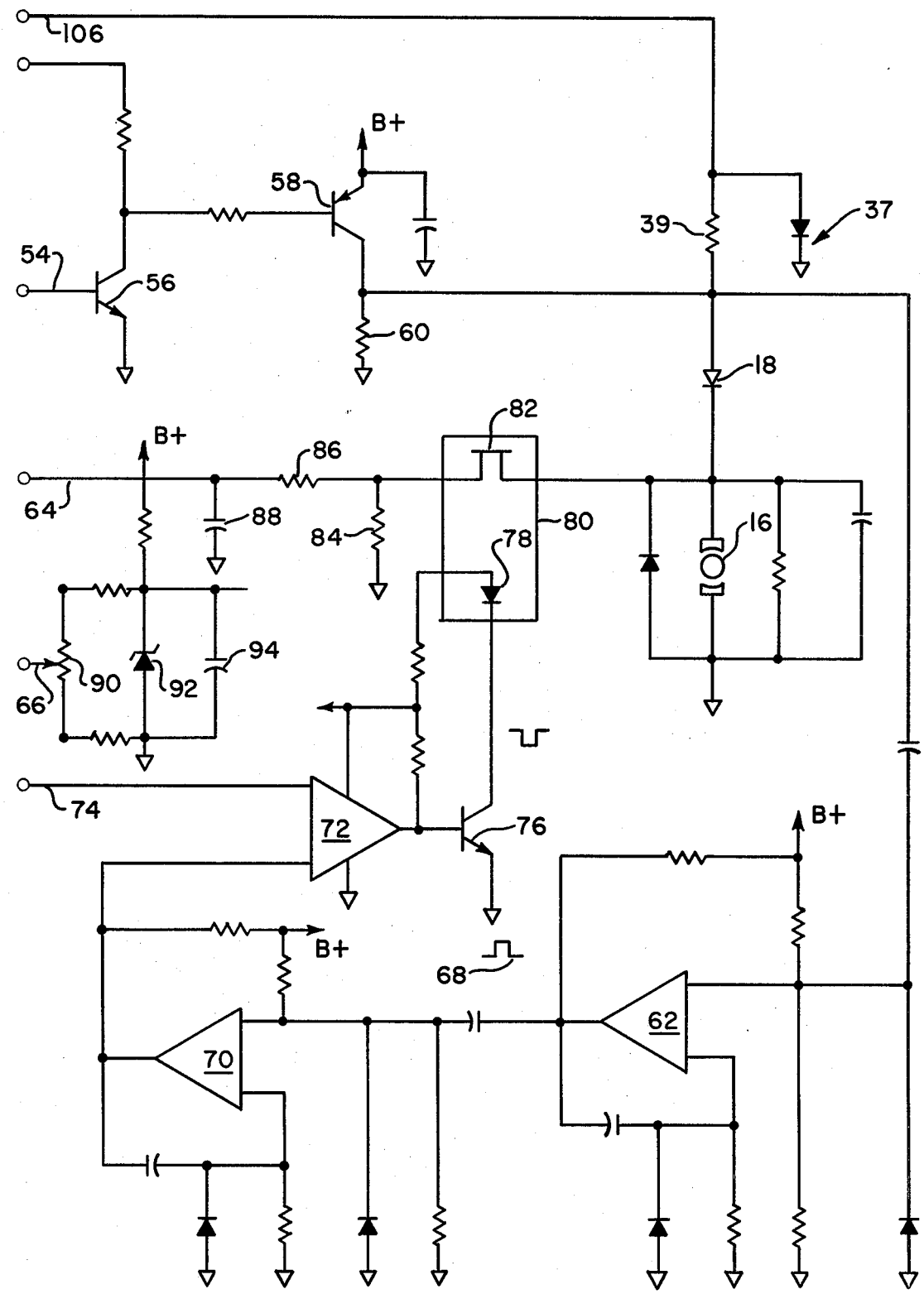

FIGS. 3A and 3B, when placed side-by-side, comprise a detailed schematic diagram of the motor control system of the invention.

With reference now to the drawings, and particularly to FIG. 1, the motor control system of the invention is particularly adapted for use with a pump used for sampling for atmospheric hazards. The pump itself is enclosed within a cartridge 10 which can be clamped onto a miner's belt, for example, or inserted into his shirt pocket. The pump produces a negative pressure in conduit 12 leading to a colorimetric or charcoal detector tube 14 which may, for example, be clipped to the miner's collar as shown in FIG. 1. Air within a coal mine, for example, is drawn through the tube 14 and pumped through the pump in housing 10. Also enclosed within the housing 10 is a mechanical counter which indicates the total volume of gas sampled and thus enables the analyst to calculate concentrations of harmful gas, vapor and dust.

A block diagram of the motor control system for the pump motor used in the apparatus of FIG. 1 is shown in FIG. 2. The motor itself is indicated by the reference numeral 16 and, as mentioned above, is preferably of the ironless rotor DC type having a very low inductance. One side of the motor is connected to ground as shown while the other side is connected through diode 18 to a voltage controlled pulse width modulator 20. Voltage pulses of variable width are thus applied to the motor 16 by modulator 20. The widths of the pulses at the output of modulator 20 are controlled by an error signal on lead 22 derived from an error amplifier 24 having two inputs connected thereto. One input is a speed adjustment set-point voltage derived from circuit 26 and the other is the output of a back EMF recovery circuit 28. The output of circuit 28 is proportional to the back EMF developed by the motor 16 and, hence, proportional to motor speed. This is compared in amplifier 24 with the output of speed adjustment set-point circuit 26; and if the two are not the same, an error signal will be generated on lead 22 to vary the output pulses from modulator 20 and, hence, vary the motor speed such that it corresponds to that dictated by the speed adjustment set-point circuit 26. The output of the error amplifier 24 is also applied to a low battery/flow failure indicator curcuit 30. Circuit 30 monitors the output of the error amplifier 24; and when the voltage at this point exceeds a preset limit, a normally-energized light-emitting diode 32, mounted on the face of the housing 10 shown in FIG. 1, is extinguished. Diode 32 will also be extinguished when a low battery condition occurs. When the light-emitting diode is extinguished, therefore, it indicates an excessive error signal amplitude due to a blocked flow condition of the pump 34 connected to motor 16 or a low battery condition.

The circuit also includes a blocked flow shutdown circuit 36 hereinafter described in greater detail. During a blocked flow condition, the motor stalls, or at least slows down causing the "on-time" (duty cycle) of the motor drive pulse to increase. The amplitude of the pulse is clamped by diode 37 (FIG. 3B) and filtered by capacitor 108 (FIG. 3A). An increase in the duty cycle of the motor drive pulse causes a corresponding increase in the voltage across capacitor 108. When the capacitor 108 voltage exceeds a predetermined limit, the shutdown circuit 36 effectively disables the modulator 20 to remove power from the motor 16 for a preselected time period of about typically 15 seconds; whereupon pulses are again applied to the motor 16 from modulator 20. Should, however, the blocked flow condition still persist after the 15 second period, circuit 36 will again disable modulator 20 for a period of 15 seconds until, when the blocked flow condition is removed, circuit 36 is reset and the motor is permitted to run continually.

A detailed schematic circuit diagram of the motor control system of FIG. 2 is shown in FIGS. 3A and 3B wherein elements corresponding to those of FIG. 2 are identified by like reference numerals. The voltage controlled pulse width modulator 20 (FIG. 2) includes an oscillator which produces, at the output terminal of operational amplifier 38 (See FIG. 3A), square-wave pulses indicated by the waveform 40. These are applied to one input of a second operational amplifier 42 having its other input connected to a reference voltage developed across a voltage divider comprising resistors 44 and 46. The output from the operational amplifier 42, in turn, is applied across a capacitor 48 which shunts the pulses to ground and then recovers, thereby producing the waveform 50 at one input of a third operational amplifier 52. The other input to the operational amplifier 52 is the error signal at the output of error amplifier 24, the arrangement being such that the point at which the amplifier 52 produces an output along the curved, rising edges of the pulses in waveform 50 will be dependent upon the magnitude of the error signal, the greater the error signal, the longer the amplifier 52 takes to conduct. In this manner, the widths of the pulses at the output of amplifier 52 will increase or decrease as the error signal correspondingly increases or decreases. These pulses at the putput of amplifier 52 are applied via lead 54 and through transistors 56 and 58 (FIG. 3B) to resistor 60 connected in shunt with diode 18 and motor 16. The pulses appearing across resistor 60 are also applied to a one-shot multivibrator 62 which produces at its output a 100-microsecond pulse 68 each time a pulse is applied to its input. These pulses are applied through a second one-shot multivibrator 70 to one input of operational amplifier 72. The other input to operational amplifier 72 on lead 74 is the reference voltage developed between resistors 44 and 46 (FIG. 3A). The output of operational amplifier 72 is, therefore, a series of pulses, each of which has a leading edge occurring 100 microseconds after the trailing edge of the pulses applied to the motor 16 and a fixed width of 100 microseconds. These are applied to a transistor switch 76 which turns ON a light-emitting diode 78 for a 100-microsecond time interval. The light-emitting diode 78 is contained within an enclosure 80 containing a field-effect transistor 82 which turns ON whenever the light-emitting diode 78 is energized. With this arrangement, the light-emitting diode turns ON and the field-effect transistor 82 conducts at the termination of a predetermined time interval (i.e., 100 microseconds) after the trailing edge of the voltage pulses to the motor 16. By the time the field-effect transistor 82 conducts after the 100-microsecond time delay, the pulse applied to motor 16 has terminated so that, with transistor 82 conducting, a voltage is developed across resistor 84 proportional to the motor back EMF. The resulting pulses developed across resistor 84 are filtered by an RC network 86, 88 and applied via lead 64 to one input of the error amplifier 24 (FIG. 3A). The other input to the error amplifier 24 on lead 66 is derived from a speed adjust potentiometer 90 (FIG. 3B) connected in shunt with a Zener diode 92 and capacitor 94. As was explained above, the operational amplifier 24 compares the back EMF developed by the motor with the speed reference voltage derived from potentiometer 90; and if the two are not the same, an error signal is developed to increase or decrease motor voltage until the back EMF and error signals are the same.

The output of the error amplifier 24 is also applied to one input terminal of an operational amplifier 96 (FIG. 3A) whose output is connected through the light-emitting diode 32, also shown in FIG. 2, to the B+ terminal of the battery supply. The other terminal to the operational amplifier 96 is connected to the junction of voltage dividing resistors 98 and 100 connected between ground and the B+ terminal of the battery supply. When the error signal at the output of amplifier 24 rises above a predetermined limit, as will occur during a blocked flow condition of the pump 34 to which the motor 16 is connected, the one input signal to the amplifier 96 will exceed the reference voltage at the junction of resistors 98 and 100 and the light-emitting diode 32 will extinguish. Similarly, if battery voltage should drop, the reference signal derived from the voltage divider 98, 100 will also drop; and, again, the light-emitting diode 32 will extinguish to indicate this condition.

The blocked flow shutdown circuit 36 is enclosed by broken lines in FIG. 3A and includes an operational amplifier 102, one input of which is connected to a blocked flow shutdown adjusting potentiometer 104 which determines the point at which shutdown will occur in response to an increased load on the motor. The other input to the operational amplifier 102 is connected to the motor drive pulse via resistor 39. The amplitude of the drive pulse is clamped by diode 37 and filtered by capacitor 108. An increased load on the motor causes an increase in the pulse width of the drive pulse. Capacitor 108 filters these pulses, causing the voltage across capcitor 108 to be proportional to the load on the motor.

When the voltage developed across capacitor 108 exceeds the reference voltage determined by potentiometer 104, a high voltage condition occurs at the output of operational amplifier 102. This increase in voltage is applied to one input of operational amplifier 110, the output of which is used to turn ON transistor 112 and short the output of amplifier 52 to ground when a blocked flow condition occurs. In order to reset the amplifier 110 and turn OFF transistor 112, reset pulses are applied to the other input terminal of operational amplifier 110 every 10 seconds; and if the blocked flow condition has been alleviated, transistor 112 will turn OFF and the output of amplifier 52 will again be applied to the motor 16. However, if the blocked flow condition persists after a pulse is applied to the upper input of amplifier 110, the transistor 112 remains ON to short the output of amplifier 52 to ground. The pulses applied to amplifier 110 are indicated by the reference numeral 111 in FIG. 3A and are developed by a pulse generator including operational amplifier 114 whose output is applied through a second-stage operational amplifier 116 to the input of amplifier 110.

The battery itself is indicated by the reference numeral 118 in FIG. 3A and is connected through diode 120 to a charging jack 122. By closing switch 124, the B+ terminal 126 is energized and all circuits are activated.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a control system for a battery-operated motor, the combination of pulse width modulating means for supplying a pulsed voltage to said motor, means for generating a voltage proportional in magnitude to the speed of said motor, means for comparing said voltage with a reference speed signal to develop an error signal for controlling the width of the output voltage pulses from said pulse width modulator, and means for periodically removing power from said motor for a fixed period when current through the motor exceeds a predetermined limit, the power being periodically removed from the motor for successive fixed periods until the motor current falls below said predetermined limit.

2. The motor control system of claim 1 wherein the means for periodically removing power from said motor includes an operational amplifier having applied to its one input a signal proportional to motor current and to another input an adjustable reference voltage, the output of said first operational amplifier being connected to the input of a second operational amplifier which actuates a transistor to short out the output of said pulse width modulating means, and means for periodically resetting said second operational amplifier to remove the short from the output of said pulse width modulating means until current through the motor drops below said predetermined limit.

3. The motor control system of claim 1 including an indicating device, and means for actuating said indicating device whenever the voltage of a battery connected to said motor control system drops below a predetermined level.

4. The motor control system of claim 3 including means for actuating said indicating device whenever said error signal rises above a predetermined limit.

5. The motor control system of claim 4 wherein said indicating device comprises a normally-energized light-emitting diode which becomes extinguished when motor current rises above said predetermined limit.

* * * * *